US012592619B2

(12) United States Patent
Zahid et al.

(10) Patent No.: US 12,592,619 B2
(45) Date of Patent: Mar. 31, 2026

(54) ROTOR SHAFT-MOUNTED VAPOR CHAMBERS AND HEAT PIPES WITH ENDCAP HEAT SINKS FOR ELECTRIC MACHINES

(71) Applicant: GM GLOBAL TECHNOLOGY OPERATIONS LLC, Detroit, MI (US)

(72) Inventors: Muhammad A. Zahid, Troy, MI (US); Alexander Forsyth, Windsor (CA); Khorshed Mohammed Alam, Canton, MI (US); Mazharul Chowdhury, Canton, MI (US); Yilun Luo, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 406 days.

(21) Appl. No.: 18/494,085

(22) Filed: Oct. 25, 2023

(65) Prior Publication Data

US 2025/0141320 A1     May 1, 2025

(51) Int. Cl.
*H02K 11/33* (2016.01)
*H02K 1/26* (2006.01)
(Continued)

(52) U.S. Cl.
CPC .............. *H02K 11/33* (2016.01); *H02K 1/26* (2013.01); *H02K 7/003* (2013.01); *H02K 9/225* (2021.01);
(Continued)

(58) Field of Classification Search
CPC ........ H02K 11/00; H02K 11/33; H02K 11/30; H02K 9/22; H02K 9/225; H02K 9/223;
(Continued)

(56) References Cited

U.S. PATENT DOCUMENTS 5,140,204 A      8/1992   Cashmore et al.
6,129,477 A  *  10/2000   Shoykhet ................ F16D 1/068
                                                              403/267
(Continued)

FOREIGN PATENT DOCUMENTS

DE          2052839 A1      4/1972
DE        10258778 A1      7/2004
(Continued)

OTHER PUBLICATIONS

Machine Translation of WO 2021032705 A1 (Year: 2021).*
(Continued)

*Primary Examiner* — Alexander A Singh
*Assistant Examiner* — Charlie Frank Mann, Jr.
(74) *Attorney, Agent, or Firm* — Quinn IP Law

(57) ABSTRACT

Presented are electric machines with rotor shaft-mounted heat pipes/vapor chambers thermally coupled to endcap-integrated heat sinks, methods for making/using such machines, and vehicles equipped with such machines. An electric machine includes an outer housing, a stator assembly mounted to the housing, and a rotor assembly rotatably mounted adjacent the stator assembly. The stator assembly includes one or more stator windings mounted to an annular stator core. The rotor assembly includes one or more electromagnetic rotor windings mounted to a cylindrical rotor core. A rotor power transfer circuit (PTC) is electrically connected to the rotor assembly to electrify the rotor winding(s). A rotor shaft is attached to the rotor core to rotate in unison therewith. One or more heat pipes are mounted on the rotor shaft's outer surface and project axially between the rotor PTC and rotor core. Each heat pipe passively extracts and transfers thermal energy from the rotor PTC.

20 Claims, 4 Drawing Sheets

(51) Int. Cl.
  *H02K 7/00*        (2006.01)
  *H02K 9/22*        (2006.01)
  *H02K 9/28*        (2006.01)

(52) U.S. Cl.
  CPC ........... *H02K 9/28* (2013.01); *H02K 2209/00* (2013.01); *H02K 2215/00* (2021.08)

(58) Field of Classification Search
  CPC ........... H02K 9/227; H02K 1/26; H02K 1/22; H02K 1/16; H02K 1/12; H02K 1/00; H02K 7/003; H02K 7/00; H02K 9/28; H02K 9/00; H02K 2215/00; H02K 2209/00
  See application file for complete search history.

(56)                References Cited

U.S. PATENT DOCUMENTS

| | | | |
|---|---|---|---|
| 6,163,127 | A | 12/2000 | Patel |
| 6,209,672 | B1 | 4/2001 | Severinsky |
| 6,528,909 | B1 | 3/2003 | Kan |
| 6,943,467 | B2 | 9/2005 | Potoradi |
| 7,569,955 | B2 | 8/2009 | Hassett |
| 8,134,260 | B2 | 3/2012 | Hassett et al. |
| 8,138,651 | B2 | 3/2012 | Rahman |
| 8,368,265 | B2 | 2/2013 | Owng |
| 8,492,952 | B2 | 7/2013 | Bradfield |
| 11,025,116 | B2 | 6/2021 | Yao |
| 11,207,982 | B2 | 12/2021 | Liu |
| 11,323,001 | B2 | 5/2022 | Nehl |
| 11,375,642 | B2 | 6/2022 | Liu |
| 11,598,589 | B2 | 3/2023 | Roy |
| 2006/0066156 | A1* | 3/2006 | Dong ..................... H02K 9/225 |
| | | | 310/54 |
| 2013/0049497 | A1 | 2/2013 | Terakadu |
| 2018/0367005 | A1 | 12/2018 | Rahman |
| 2021/0408888 | A1* | 12/2021 | Grundmann .......... H02K 55/04 |
| 2022/0239197 | A1 | 7/2022 | Yatsurugi |
| 2023/0011641 | A1 | 1/2023 | Keum |
| 2023/0046826 | A1 | 2/2023 | Keum |
| 2023/0208216 | A1 | 6/2023 | Momen |

FOREIGN PATENT DOCUMENTS

| | | | | |
|---|---|---|---|---|
| DE | 102017214776 | A1 * | 4/2018 | ............. H02K 3/527 |
| DE | 102022122605 | | 1/2023 | |
| DE | 102022122605 | A1 * | 1/2023 | ............... H02K 1/32 |
| DE | 102021133858 | A1 * | 6/2023 | ............. H02K 3/527 |
| JP | S55166162 | A | 12/1980 | |
| JP | S56102980 | A | 8/1981 | |
| WO | WO-2013001559 | A1 * | 1/2013 | ............. H02K 19/12 |
| WO | WO-2021032705 | A1 * | 2/2021 | ........... H01F 27/366 |

OTHER PUBLICATIONS

Machine Translation of DE 102017214776 A1 (Year: 2018).*
Machine Translation of DE 102022122605 A1 (Year: 2023).*
Machine Translation of DE 102021133858 A1 (Year: 2023).*
Machine Translation of WO 2013001559 A1 (Year: 2013).*

* cited by examiner

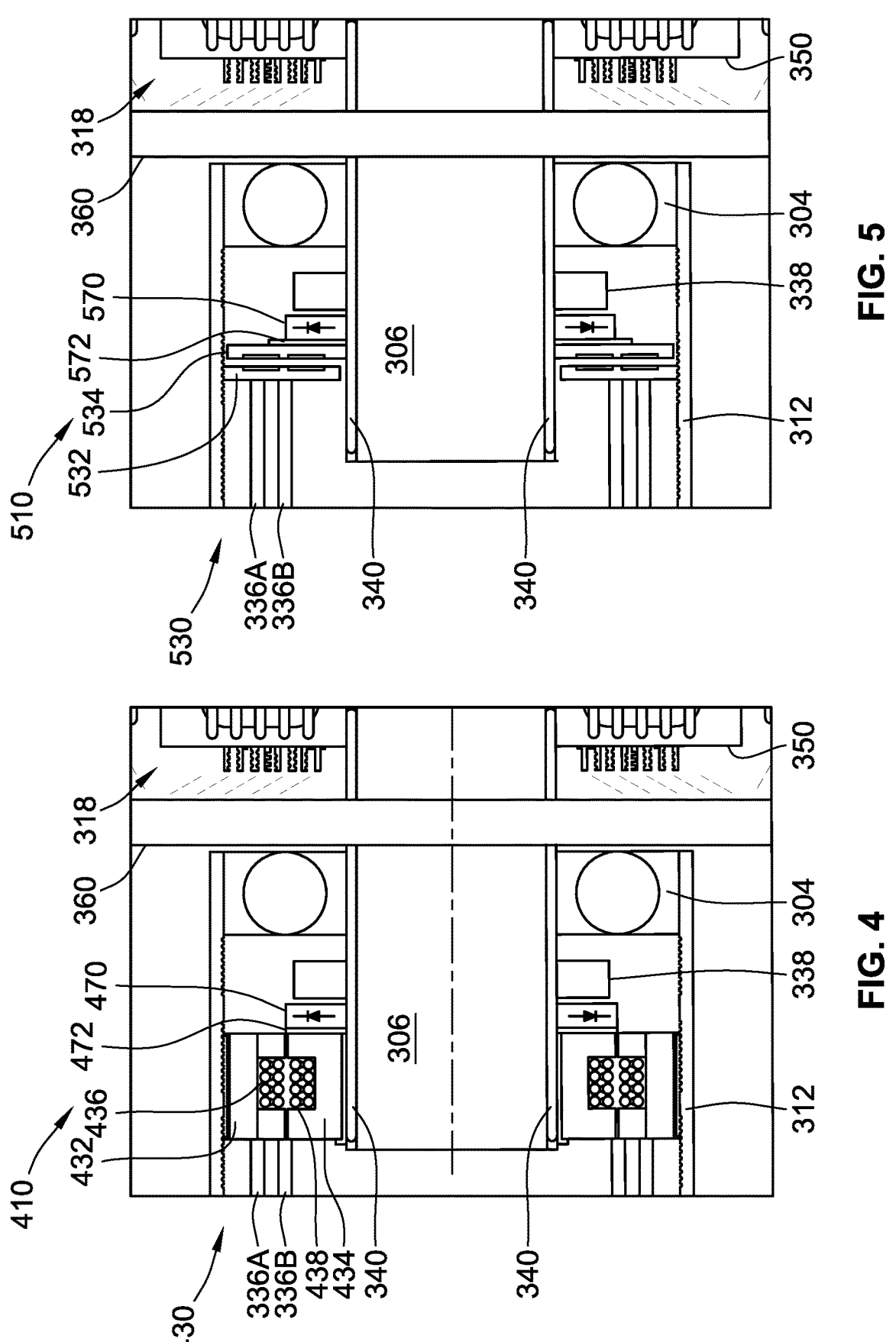

ROTOR SHAFT-MOUNTED VAPOR CHAMBERS AND HEAT PIPES WITH ENDCAP HEAT SINKS FOR ELECTRIC MACHINES

INTRODUCTION

The present disclosure relates generally to electric machines. More specifically, aspects of this disclosure relate to thermal management systems for regulating the operating temperatures of separately excited motor (SEM) assemblies.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability, relative light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

SUMMARY

A traction motor is an electric machine that converts electrical energy into rotational mechanical energy to propel a vehicle, such as FEV and HEV-type automobiles. Many traction motors contain a fixedly mounted stator that carries multiphase electromagnetic windings, such as copper hairpin or I-pin bars, and a rotatable rotor that bears an engineered pattern of magnets, such as core-mounted permanent magnets (PM), or electromagnetic armature windings, such as core-mounted copper coils. Traction motors may be categorized as alternating current (AC) or direct current (DC), brushed or brushless, rotary or linear, and radial flux or axial flux. In radial-flux, internal-rotor designs, the rotor may be coaxially nested inside the stator, whereas axial-flux rotary designs may juxtapose the rotor and stator as facing, coaxial plates. Rotational excitation of the rotor assembly may be effected by a magnetic field that is produced by passing current through multiphase AC stator windings; this stator-emitted magnetic field interacts with a mating magnetic field that is produced by rotor-borne permanent magnets or DC armature coils.

The rotor assemblies for many modern-day traction motors include a rotor core that is fabricated from thin ferromagnetic discs that are stacked and laminated together into a cylindrical body. Each rotor disc has several openings that, when aligned with the openings of neighboring discs, form rotor slots that extend axially through the length of the rotor core. Persistent-state or electrically excited magnetic elements, such as PM bars or copper coils, are inserted into these rotor slots and secured to the rotor core. Unlike permanent magnet motor constructions, in which the rotor assembly bears internal or surface-mounted magnets, a separately excited motor (SEM) is generally typified by rotor-borne armature windings that electromagnetically mate with stator-borne field windings to convert electrical energy into mechanical energy. The rotor core may be mounted onto a motor shaft for outputting propulsion-generating motor torque produced by the motor or for inputting electricity-generating regenerative torque received by the motor.

During operation of a traction motor, the internal electrical and electromagnetic hardware may generate a significant amount of heat, e.g., due to windage, friction, and hysteresis losses. An integrated motor cooling system may be employed to prevent undesirable overheating conditions within the motor. Active thermal management (ATM) systems, for example, employ a central controller or dedicated control module to regulate the operation of a cooling circuit that circulates coolant fluid through the heat-producing motor components. For indirect liquid cooling systems, a heat-transfer coolant is circulated through a network of internal channels and pipes within the motor housing. In contrast, direct liquid cooling systems—or "liquid immersion cooling" (LIC)—splash, spray, or immerse parts of the motor with/within a direct-conduction dielectric liquid coolant.

Presented herein are electric machines with rotor shaft-mounted heat pipes and/or vapor chambers thermally coupled with endcap-integrated heat sinks, methods for manufacturing and methods for operating such machines, and vehicles equipped with such machines. By way of non-limiting example, a novel separately excited motor design extracts heat from the rotor power transfer circuit (PTC) by securing heat pipes and/or vapor chambers onto the rotor shaft. Extracted heat may be transmitted axially from the PTC package towards a longitudinal end of the rotor core and transferred into the larger thermal body of a rotor endcap. The rotor endcap may be fabricated with fins that dissipate the transferred heat into an interior coolant volume of the drive unit (DU) housing. Spray or splash-type cooling may be employed to extract heat from the pin fins and concomitantly carry the thermal energy out from the DU housing. A circular array of circumferentially spaced heat pipes/vapor chambers may be partially embedded within a polymeric coating on the outer-diameter (OD) surface of the rotor shaft. Axially projecting pin fins may be integrally formed onto an axial face of the rotor endcap to convect heat to the DU housing volume. Endcap spray cooling and/or splash cooling may be employed to accelerate endcap thermal conductivity and, thus, facilitate heat extraction from the PTC components.

Attendant benefits for at least some of the disclosed concepts include SEM architectures with reduced operating temperatures (e.g., at worst-case operating points (WCOP)) that result in enhanced motor efficiency and expanded motor performance limits (i.e., over comparable IPM designs). Unlike complex shaft-fed ATM cooling designs, which add significant cost, complexity, and points of failure to the system, disclosed SEM designs use sealed heat pipes/vapor chambers and endcap heat sinks to quickly and efficiently extract heat from select motor components. Other attendant advantages may include SEM systems that eliminate the need for rare earth (RE) and heavy rare earth (HRE) materials that may be susceptible to volatile price variations and commodity shortages. Unlike many conventional SEM solutions, which elect to operate at lower peak currents and limit peak operating speeds to reduce motor temperatures, disclosed SEM systems use both active and passive cooling features to extract heat and, thus, expand SEM peak performance limits.

Aspects of this disclosure are directed to rotor shaft-mounted vapor chambers and/or heat pipes for cooling the electric PTC packages of electric machines, such as motors, generators, transformers, inductors, dynamometers, converters, etc. In an example, an electric machine includes a protective outer housing, a stator assembly fixedly attached to the housing, and a rotor assembly rotatably attached to the housing adjacent the stator assembly. The stator assembly includes a stator core with at least one stator slot and at least one electromagnetic stator winding mounted in the stator slot(s). In the same vein, the rotor assembly includes a rotor core with at least one rotor slot and at least one electromagnetic rotor winding mounted in the rotor slot(s). A rotor power transfer circuit is attached to the machine housing, e.g., spaced axially from the rotor core and packaged within a discrete PTC compartment. The PTC is electrically connected to the rotor assembly, e.g., via the rotor shaft, to electrify the rotor winding(s) via a DC power feed. A rotor shaft is fixedly attached to the rotor core, e.g., via keying, splining, or hub, to rotate in unison with the core. At least one heat pipe is mounted onto an outer surface of the rotor shaft, projecting axially along the shaft between the rotor PTC and the rotor core. Each heat pipe passively extracts thermal energy from the rotor PTC and transfers the extracted thermal energy out of the rotor PTC.

Additional aspects of this disclosure are directed to electric-drive vehicles that are propelled by SEM-type traction motors cooled by rotor shaft-mounted vapor chambers and/or heat pipes. As used herein, the terms "vehicle" and "motor vehicle" may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, e-bikes, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, the vehicle is equipped with a rechargeable energy storage system (RESS) (e.g., traction battery pack) that powers an electrified powertrain. The powertrain employs one or more SEM-type traction motor/generator units (MGU), which operate alone (e.g., for FEV powertrains) or in conjunction with an internal combustion engine assembly (e.g., for HEV powertrains), to drive one or more of the road wheels to thereby propel the vehicle.

Continuing with the preceding discussion, the traction motor includes a protective and insulated motor housing, a stator assembly that is rigidly mounted inside the motor housing, and a rotor assembly that is rotatably mounted inside the motor housing adjacent the stator assembly. The stator assembly includes an annular stator core with a series of circumferentially spaced stator slots within which are mounted multiple electromagnetic stator windings (e.g., copper hairpin winding bars). Conversely, the rotor assembly includes a cylindrical rotor core that is nested inside of and circumscribed by the annular stator core. The rotor core has a series of circumferentially spaced rotor slots within which are mounted multiple electromagnetic rotor windings (e.g., copper winding coils). A rotor PTC is mounted inside the motor housing, e.g., spaced axially from the rotor core and circumscribing the rotor shaft. The rotor PTC is electrically connected to the rotor assembly to selectively electrify the rotor windings. A rotor shaft circumscribed by and attached to the rotor core to rotate in unison therewith. Multiple heat pipes are mounted on an outer-diameter surface of and spaced circumferentially around the rotor shaft. Each heat pipe passively extracts thermal energy from the rotor PTC and transfers the extracted thermal energy out of the rotor PTC.

Aspects of this disclosure are also directed to manufacturing workflow processes, computer-readable media, and control logic for making or for using any of the disclosed PTC cooling systems, electric machines, and/or motor vehicles. In an example, a method is presented for assembling an electric machine. This representative method includes, in any order and in any combination with any of the above and below disclosed options and features: receiving a housing of the electric machine; attaching a stator assembly to the housing, the stator assembly including a stator core and an electromagnetic stator winding mounted to the stator core; attaching a rotor assembly to the housing such that the rotor assembly is adjacent and rotatable with respect to the stator assembly, the rotor assembly including a rotor core and an electromagnetic rotor winding mounted to the rotor core; attaching a rotor power transfer circuit to the housing such that the rotor PTC is spaced axially from the rotor core and electrically connected to the rotor assembly to electrify the rotor winding; attaching a rotor shaft to the rotor core to rotate in unison therewith; and mounting a heat pipe on an outer surface of the rotor shaft such that the heat pipe projects axially between the rotor PTC and the rotor core, the heat pipe being configured to passively extract thermal energy from the rotor PTC and transfer the thermal energy out of the rotor PTC.

For any of the disclosed vehicles, methods, and electric machines, the integrated thermal management system may employ a single heat pipe or multiple heat pipes, which are mounted on the shaft's outer surface and spaced circumferentially around the rotor shaft. Each heat pipe may sit flush against the shaft's outer surface and may be substantially parallel to the rotor shaft. It is also envisioned that the rotor shaft be fabricated with axially elongated, surface-recessed slots into which may be seated the heat pipes. Alternatively, the entire heat pipe may be radially spaced from the rotor shaft or, alternatively, one end of the heat pipe may be radially spaced from the rotor shaft and another end of the heat pipe may press against the rotor shaft. The heat pipes may be mutually parallel to one another and the rotor shaft and, if desired, may be spaced equidistant from each other around the rotor shaft. One or more of all of the heat pipes may be replaced with a planar or arcuate vapor chamber.

For any of the disclosed vehicles, methods, and electric machines, the outer surface of the rotor shaft may be covered, in whole or in part, with a polymeric surface coating. It may be desirable that the surface coating be formed as a single-piece, unitary structure from an electrically insulating thermoplastic polymer. In this instance, each heat pipe is at least partially embedded within the polymeric surface coating. To enhance PTC-to-pipe thermal coupling, a thermal interface material (TIM) may be interposed between and abut the heat pipes and the rotor PTC. The TIM layer electrically insulates the electric PTC components from the heat pipes. The rotor PTC contains multiple electric components that circumscribe the rotor shaft. In this instance, the heat pipes may extend through central cavities of and thermally couple to one or more of the PTC's electric components. For contact-based rotor PTC, the PTC components may include a pair of (first and second) electric brushes respectively coupled with a pair of (first and second) slip rings; in this instance, the heat pipes may contact the slip rings. For non-contact-based PTC, the components may include rectifiers, rectifier printed circuit boards (PCB), electromagnetic couplings, mating capacitive plates, etc.

For any of the disclosed vehicles, methods, and electric machines, each heat pipe may include a sealed, thermally conductive canister (e.g., copper or aluminum tube) that contains a working fluid (e.g., water, acetone, methanol, or ammonia). The working fluid changes phases between liquid and gas to thereby extract heat from the rotor PTC and transmit the extracted heat out through one or both axial ends of the PTC package. Located inside the heat pipe canister is a wick structure (e.g., grooved, sintered, or screen-type wick) that abuts and, if desired, covers an interior surface of the canister. The wick structure carries the liquid-phase working fluid, e.g., via capillary action, to a proximal (first) axial end of the canister. An elongated vapor channel may extend longitudinally through the center of the wick structure. The vapor channel transmits the working fluid, when vaporized to a gas, to a distal (second) axial end of the sealed canister; when the working fluid is condensed to a liquid, the vapor channel transmits the fluid into the wick structure.

For any of the disclosed vehicles, methods, and electric machines, a left-side (first) rotor endcap may be attached to one axial end of the rotor core and a right-side (second) rotor endcap may be attached to the opposite axial end of the rotor core. A rotor endcap may abut a longitudinal end of the heat pipe(s) to receive therefrom the thermal energy extracted from the rotor PTC. The rotor endcap may be a toroidal, plate-like structure that includes one or more heat pipe cavities, each of which is recessed into an inner-diameter radial surface of the rotor endcap and nests therein the longitudinal end of the heat pipe. The rotor endcap may be fabricated with a set of endcap fins that project axially away from the rotor core; these endcap fins dissipate the extracted thermal energy transferred out from the rotor PTC and received by the rotor endcap. An optional active thermal management system may splash or spray a dielectric coolant fluid onto the endcap fins and, if desired, pump the heated coolant fluid away from the rotor assembly.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

BRIEF DESCRIPTION OF THE DRAWINGS

FIG. 4 is a sectional side-view illustration of another representative electric machine with rotor shaft-mounted heat pipes and endcap-integrated heat sinks for removing heat from a non-contact type (inductive) rotor PTC in accord with aspects of the present disclosure.

FIG. 5 is a sectional side-view illustration of yet another representative electric machine with rotor shaft-mounted heat pipes and endcap-integrated heat sinks for removing heat from another non-contact type (capacitive) rotor PTC in accord with aspects of the present disclosure.

Figure 1:
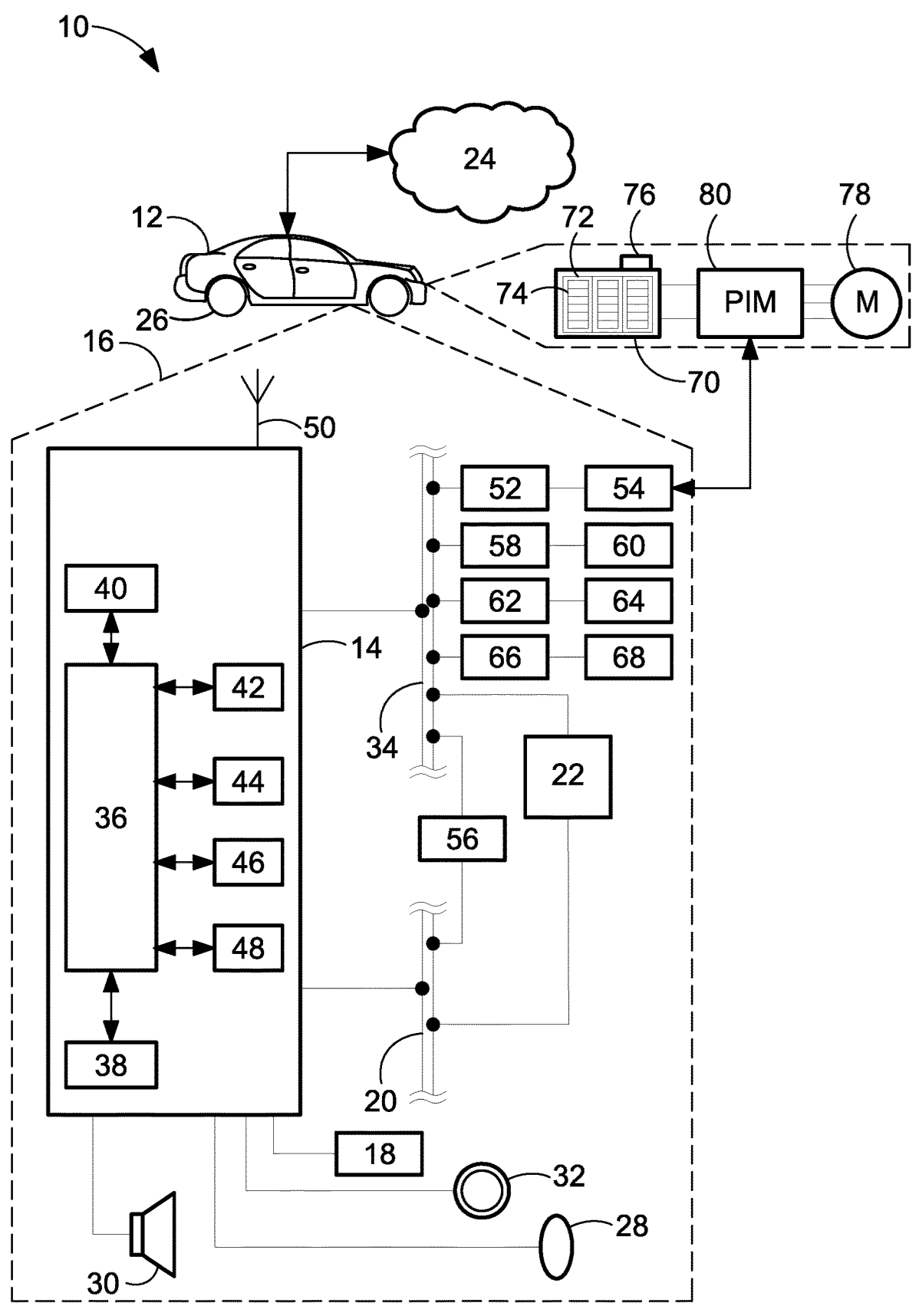
FIG. 1 is a partially schematic, side-view illustration of a representative motor vehicle with a rechargeable traction battery pack, a high-voltage electrical system, and an SEM-based electrified powertrain with which aspects of this disclosure may be practiced.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing,"

"comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into an FEV powertrain powered by a single-pack RESS and a single SEM traction motor should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles, SEM drives, and HV electrical systems are shown and described in additional detail herein. Nevertheless, the vehicles, SEMs, and electrical systems discussed below may include numerous additional and alternative features, and other available peripheral components, for carrying out the various methods and functions of this disclosure.

The representative vehicle 10 of FIG. 1 is originally equipped with a centerstack telecommunications and information ("telematics") unit 14 that wirelessly communicates, e.g., via cell towers, satellite service, etc., with a remotely located cloud computing host service 24 (e.g., ONSTAR®). Other in-vehicle hardware components 16 shown in FIG. 1 include, as non-limiting examples, an electronic video display device 18, a microphone 28, audio speakers 30, and assorted user input controls 32 (e.g., buttons, knobs, switches, touchscreens, etc.). These hardware components 16 function as a human/machine interface (HMI) that enables a user to communicate with the telematics unit 14 and other components both resident to and remote from the vehicle 10. Microphone 28, for instance, provides occupants with means to input verbal commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. Network connection interface 34 enables vehicle hardware 16 to send and receive signals with one another and with systems and subsystems both onboard and off-board the vehicle body 12. This allows the vehicle 10 to perform assorted vehicle functions, such as modulating powertrain output, activating a vehicle brake system, controlling vehicle steering, regulating charge and discharge of vehicle batteries, and other automated functions. For instance, telematics unit 14 may receive and transmit signals to/from a Powertrain Control Module (PCM) 52, an Onboard Charging Module (OBCM) 54, an Electronic Battery Control Module (EBCM) 56, a Steering Control Module (SCM) 58, a Brake System Control Module (BSCM) 60, and assorted other vehicle ECUs.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to an IC real-time clock (RTC) 42 and one or more electronic memory devices 38, each of which may take on the form of a CD-ROM, solid-state drive (SSD) memory, hard-disk drive (HDD) memory, semiconductor memory, etc.

Long-range communication (LRC) capabilities with off-board devices may be provided via a cellular communication component, a navigation and location component (e.g., global positioning system (GPS) transceiver), or a wireless modem, all of which are collectively represented at 44. Short-range communication (SRC) may be provided via a close-range wireless communication device 46 (e.g., a BLUETOOTH® unit), a dedicated short-range communications (DSRC) component 48, and/or a dual antenna 50. It should be understood that the vehicle 10 may be implemented without one or more of the above-listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of on-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is represented in FIG. 1 by an electric traction motor 78 that is connected to a rechargeable energy storage system (RESS), which may be in the nature of a chassis-mounted traction battery pack 70. The battery pack 70 may contain one or more battery modules 72 each housing a group of electrochemical battery cells 74, such as lithium-ion or lithium-polymer battery cells of the pouch, can, or prismatic type. One or more electric machines, such as an adjustable-speed, multiphase SEM motor/generator (M) unit 78, draw electrical power from and, optionally, deliver electrical power to one or more rechargeable battery units, such as traction battery pack 70. An HV electrical system with a power inverter module (PIM) 80 electrically connects the battery pack 70 to the motor/generator unit(s) 78 and modulates the transfer of electrical current therebetween. The battery pack 70 may be configured such that module management, cell sensing, and module-to-host communications functionality is integrated directly into each module 72 and performed wirelessly via a wireless-enabled cell monitoring unit (CMU) 76.

Figure 2:
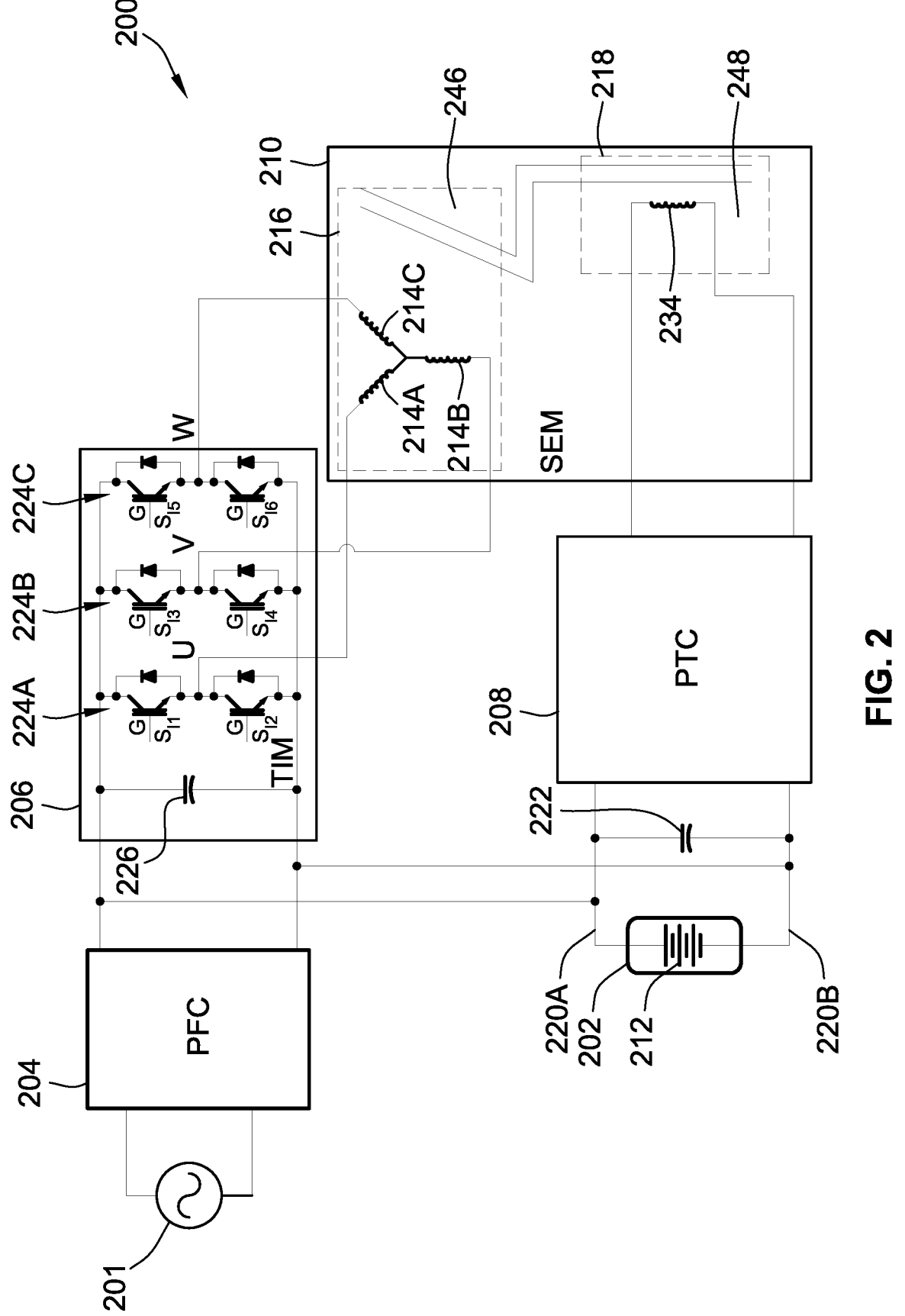
FIG. 2 is a schematic one-line diagram illustrating a representative SEM drive system with which aspects of this disclosure may be practiced.

Turning next to FIG. 2, there is shown a non-limiting example of an SEM drive system 200 that may be adapted for electrically connecting and disconnecting a rechargeable battery assembly 202 to a high-voltage electric power source, such as an AC power utility grid 201. Although differing in appearance, it is envisioned that any of the features and options described herein with reference to the traction motor of FIG. 1 and the electric machines of FIGS. 3-5 may be incorporated, singly or in any combination, into the SEM drive system of FIG. 2, and vice versa. While not per se limited, the SEM drive system 200 of FIG. 2 may be typified by a rechargeable battery assembly 202, a power factor correction (PFC) device 204, a traction inverter module (TIM) device 206, a power transfer circuit (PTC) device 208, and a separately excited motor (SEM) unit 210.

The rechargeable battery assembly 202 may take on any of the herein described battery options, including one or more battery packs or one or more battery modules that each contains one or more rechargeable battery cells 212 (e.g., liquid, polymer or solid-state cell configurations in prismatic, pouch, or cylindrical cell form factors). Moreover, each battery assembly 202 may contain a set of solid-state relay contactors/switches (not shown) that are independently responsive to signals from a suitable controller/control module (e.g., EBCM) to govern the electrical output of the battery system. While only one battery assembly 202 and one motor 210 are shown in FIG. 2 for illustrative simplicity, the SEM drive system 200 may include any number of battery units, motor units, and associated electrical hardware without departing from the intended scope of this disclosure.

A DC-to-AC and AC-to-DC power inverter 206, which may be part of a traction inverter module (TIM), connects to the SEM unit 210 via polyphase windings 214A, 214B and 214C to transmit electrical energy between the SEM 210 and battery assembly 202. In FIG. 2, the TIM device 206 (also referred to as "inverter stage" or "inverter subcircuit") is directly electrically connected to and interposed between the PFC device 204 and the SEM unit 210. In the illustrated example, the TIM device 206 lacks a direct electrical connection to the rotor assembly 218 of the SEM unit 210. A direct-current battery output voltage is delivered from the battery 202 to the TIM 206 and PTC 208 across positive and negative voltage bus rails 220A and 220B with an optional fixed-type DC bus capacitor 222 placed across the rails 220A, 220B.

Representative power inverter topologies may incorporate multiple inverters and respective motor control modules operable to receive motor control commands and control inverter states therefrom for providing motor drive or regenerative functionality. The TIM device 206 of FIG. 2 may contain one or more pairs of serially connected electromechanical or semiconductor switches that cooperatively convert DC power from one or more energy storage devices (e.g., battery assembly 202) to AC voltage for powering one or more electric machines (e.g., SEM unit 210) via high-frequency switching. In accord with the illustrated example, the TIM device 206 contains six semiconductor switches $S_{I1}$, $S_{I2}$, $S_{I3}$, $S_{I4}$, $S_{I5}$, and $S_{I6}$ that are arranged in three pairs 224A, 224B, and 224C of serially connected solid-state TIM switches. These three switch pairs 224A, 224B and 224C may be electrically connected in parallel with each other. Each switch $S_{I1}$-$S_{I6}$ may be embodied as a voltage-controlled bipolar switching device in the form of an insulated gate bipolar transistor (IGBT), a metal-oxide semiconductor field effect transistor (MOSFET), a wideband Gallium Nitride (GaN) device (WBG), or other suitable switch having a corresponding gate to which a gate signal is applied to change the on/off state of the switch.

Each pair of solid-state TIM switches 224A, 224B and 224C may be electrically connected in series to a respective one of the stator-borne field windings 214A, 214B, 214C of an SEM stator assembly 216. Power inverters, such as the TIM device 206 of FIG. 2, may use rapid controller-automated switching control techniques, e.g., pulse-width modulation (PWM) signals, to invert DC power supplied during discharge of the battery unit 202 into AC power suitable for driving the SEM unit 210. A pre-charge circuit (not shown) may be used to charge a DC link capacitor 226 within the TIM device 206 at a controlled rate so as to equalize a voltage across the various pairs of switches 224A-224C prior to closing contactors/switches within the battery unit 202.

A multilevel PFC device 204 selectively electrically connects to the electric power source 201 and, once connected, is interposed between the power source 201 and the remainder of the SEM drive system 200 (i.e., the battery unit 202, TIM 206, PTC 208 and SEM 210). This PFC device 204 (also referred to as a "PFC stage" or "PFC converter") provides power factor correction through shaping of the input current, e.g., to meet electric current harmonic limits of the system 200. In FIG. 2, the PFC device 204 is directly electrically connected to and interposed between the power source 201 and the TIM device 206. This PFC device 204 may be located on the stator-side of the SEM drive system 200, opposite that of the battery unit 202. A PFC subcircuit may take on a variety of different topologies, including single-phase and multiphase PFC constructs, multilevel (2-level, 3-level . . . N-level) PFC constructs, active and hybrid switching PFC constructs, etc. A multiphase PFC may be apropos for applications such as that shown in FIG. 2 in which the PFC is located on the stator-side of the SEM in-line with the motor's polyphase windings.

A multilevel PTC device 208 (also referred to as a "PTC stage" or "rotor PTC") is electrically connected on an output-side thereof to the rotor-side of the SEM unit 210 and on an input-side thereof to both the battery unit 202 and the PFC device 204. The PTC device 208 of FIG. 2 may provide single-phase rotor excitation functionality for the SEM's rotor assembly 218, e.g., for optimized motor control and system charging. In FIG. 2, the PTC device 208 is directly electrically connected to and interposed between the battery unit 202 and the SEM rotor assembly 218. In the illustrated example, the PTC device 208 lacks a direct electrical connection to the stator assembly 216 of the SEM unit 210.

Interposed between the TIM 206 and PTC 208 is a separately excited motor unit 210 that is powered by the rechargeable battery assembly 202 to produce motor output torque, e.g., to rotate the drive wheels 26 of FIG. 1 and thereby propel the vehicle 10 or to perform work in a non-automotive SEM drive application. Unlike polyphase PM electric motors, which rely on rotor-borne permanent magnets, a synchronous wound-field SEM is generally typified by rotor-borne armature windings that electromagnetically mate with stator-borne field windings to convert electrical energy into mechanical energy. As shown, the SEM unit 210 contains a rotor assembly 218 that is coaxial with and rotatable with respect to a stator assembly 216. For radial-flux, internal-rotor designs, the stator assembly 216 includes an annular stator core 246 that carries multiple electromagnetic stator "field" windings 214A-214C. The rotor assembly 218, in contrast, includes a cylindrical rotor core 248 that carries one or more electromagnetic rotor "armature" windings 234. In this example, the rotor core 248 is rotatably mounted inside a hollow center of the stator core 246 such that the stator assembly 216 circumscribes the rotor assembly 218.

The field windings 214A-214C and armature windings 234 are energized with electrical power supplied by the battery assembly 202; once energized, the stator-borne field windings 214A-214C electromagnetically couple with and drive the rotor-borne armature winding 234 (the electromagnetic coupling represented in FIG. 2 by the S-shaped parallel lines connecting the stator 216 and the rotor 218). A motor output member, which may be in the nature of a rotor shaft (FIG. 4), may be splined, keyed, bolted, or otherwise fixedly attached to the rotor core 248 to rotate in unison therewith and output therefrom motor torque. Although not per se limited, the stator and rotor cores 246, 248 may be fabricated as laminate core constructions each composed of a stack of iron or other ferrous plates. While illustrated and described as a radial-flux electric machine, the SEM unit 210 may take on axial-flux and transverse-flux architectures within the scope of this disclosure.

Separately excited (induction) motors are not only an excellent alternative to many interior permanent magnet (IPM) motors in terms of performance and efficiency, SEMs also eliminate the costs and relatively short operational life expectancy of rare earth (RE) and heavy rare earth (HRE) magnets. However, the additional power electronics used to excite the armature windings of an SEM unit generate heat that needs to be mitigated to ensure the SEM functions most effectively at all operating points. To help regulate the operating temperatures of separately excited machines, disclosed thermal management systems use rotor shaft-mounted heat pipes and/or vapor chambers to extract and evacuate heat from the rotor power transfer circuit while the PTC is feeding DC power to the rotor windings. The heat pipes/vapor chambers may be packaged for direct (contact) or indirect (non-contact) extraction of heat to efficiently and effectively cool the SEM. Once extracted, the heat pipes/ vapor chambers may transmit the PTC-generated heat out of the power electronics package and transfer the extracted heat to a larger thermal mass for dissipation. For contact-based power transfer circuits, heat may be extracted from the brushes and slip rings; for non-contact-based power transfer circuits, heat may be extracted from the rectification power electronics and rotating capacitive plates.

To reduce the cost, complexity, and warranty issues associated with typical active thermal management of rotor PTCs, such as sump cooling or jet impingement, disclosed passive thermal management systems employ axial heat pipes/vapor chambers that are rigidly mounted onto the outer-diameter surface of the rotor shaft to extract heat from the PTC's electric components (e.g., slip rings and brushes). Heat pipes/vapor chambers are self-contained heat-sink devices that do not use rotating seals, glycol pumps, or other moving parts that may fail during system operation. Moreover, disclosed rotor shaft-mounted heat pipes and vapor chambers are enclosed, passive thermal management devices that do not interact or interfere with the stator and, thus, reduce system complexity while ensuring that the rotor operating speeds, inertial mass, and structural integrity are maintained for high-speed operation.

Figure 3:
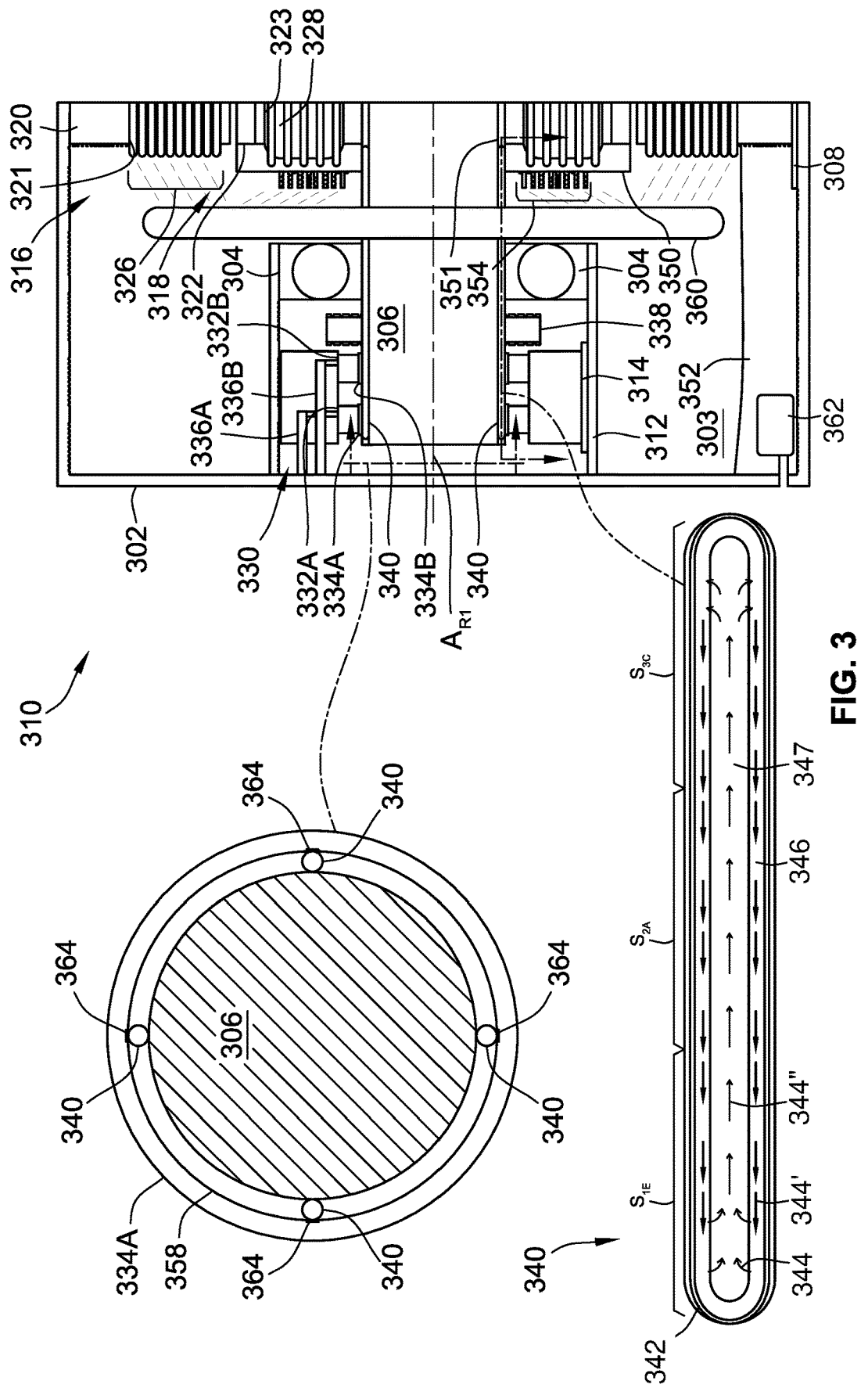
FIG. 3 is a sectional side-view illustration of a representative electric machine with rotor shaft-mounted heat pipes and endcap-integrated heat sinks for removing heat from a contact-type (brushed) rotor PTC in accord with aspects of the present disclosure.

Turning next to FIG. 3, there is shown another example of an electric machine 310, which is represented as a radial-flux, internal-rotor-type separately excited motor unit that is cooled with rotor shaft-mounted heat pipes/vapor chambers, endcap-integrated heat sinks, and optional spray or splash-type ATM cooling. As mentioned above, it is envisioned that any of the features and options described with reference to the traction motor 78 of FIG. 1 and the SEM unit 210 of FIG. 2 can be incorporated, singly or in any combination, into the electric machine 310 of FIG. 3, and vice versa. As some non-limiting points of similarity, the electric machine 310 of FIG. 3 is assembled with a protective and insulated outer housing 302 (e.g., a cast-metal integrated electric drive unit (EDU) housing) that provides the mechanical interface for mounting to a system support structure (e.g., unibody or body-on-frame chassis). A multiphase, field-wound and AC-fed stator assembly 316 is rigidly mounted inside the housing 302, e.g., via an axial clamping ring 308. Spaced across an airgap from the stator assembly 316 is a single-phase, armature-wound and DC-fed rotor assembly 318, which is rotatably mounted inside the housing 302, e.g., via high-speed precision roller bearings 304. The rotor assembly 318 is securely mounted, e.g., via keying, splining, collar, hub, etc., onto a power-transmitting (motor or output) shaft 306 to rotate in unison therewith. This shaft 306 functions to output torque generated by the electric machine 310 and/or to receive input torque generated by an external source.

Similar to the stator assembly 216 of FIG. 2, the stator assembly 316 of FIG. 3 is constructed with a flux-permeable, stacked-laminate annular stator core 320 having multiple circumferentially spaced stator slots 321 that are aligned radially with and extend axially through the stator core 320. Wound through each axially elongated slot 321 of the stator core 320 is a respective set of electromagnetic conductors 326 (also referred to herein as "stator winding" or "field winding"), which may be in the nature of hairpin, I-pin, D-pin, or flat bar copper conductors. Partitioning the radially innermost ends of the slots 321 are stator teeth that point towards the outer-diameter (OD) periphery of the rotor assembly 318. Stator teeth direct the magnetic flux produced by the stator windings 326 across the airgap to electromagnetically link with electromagnets borne by the rotor assembly 318 before completing the flux path back to the stator assembly 316.

Similar to the rotor assembly 218 of FIG. 2, the rotor assembly 318 of FIG. 3 is constructed with a magnetically permeable, stacked-laminate cylindrical rotor core 322, which has multiple circumferentially spaced rotor slots 323 that are radially recessed within and extend axially through the rotor core 322. The rotor core 322 is nested inside of and circumscribed by the stator core 320 such that both cores 320, 322 are coaxial with the shaft 306. Wound through the axially elongated rotor slots 323 is an electromagnetic conductor 328 (also referred to herein as "rotor winding" or "armature winding"), which may be in the nature of a single-wire or multi-wire winding composition of solid-wire or stranded-wire copper coils. Partitioning the radially outermost ends of the slots 323 are rotor teeth that point towards the inner-diameter (ID) periphery of the stator assembly 316. These rotor teeth direct the magnetic flux produced by the rotor winding 328 across the airgap to electromagnetically link with electromagnets borne by the stator assembly 316.

Operation of the SEM 310 of FIG. 3 is effected, in part, by a magnetic field that is produced by the rotor assembly 318 upon receipt of a DC current supplied by a suitable source of electric energy, such as the traction battery pack 70 of FIG. 1 (e.g., for automotive applications) or the battery assembly 202 (e.g., for non-automotive applications). Since the rotor assembly 318 rotates during operation of the electric machine 310, the supply of DC power to the rotor winding(s) 328 is provided through a rotating electromechanical interface, namely rotor power transfer circuit 330. For a contact-type PTC configuration, this rotating interface may be typified by a pair of electrically conductive (positive and negative) brushes 332A and 332B—a "stationary side" of the PTC—that respectively mate with a pair of electrically conductive (positive and negative) slip rings 334A and 334B—a "rotating side" of the PTC. The brushes 332A, 332B are rigidly secured inside a dedicated PTC ("dry area") compartment 312 of the housing 302 via a brush carrier assembly 314. Conversely, the slip rings 334A, 334B are secured onto and extend circumferentially around the OD surface of the rotor shaft 306 and thereby movably mount inside the PTC compartment 312. Each brush 332A, 332B is electrically coupled to a respective (positive and negative) electric lead 336A and 336B and slides against a respective slip ring 334A, 334B to thereby transfer DC current from the electric energy source to the rotor assembly 318 to energize the armature winding(s) 328. A target position sensor 338, which may be in the nature of a potentiometer, inductive angular sensor, or rotary encoder, actively monitors a rotational position of the rotor shaft 306 and, thus, the slip rings 334A, 334B.

To passively cool the electric machine 310, at least one heat pipe 340 is operatively attached to the rotor shaft 306 to extract thermal energy from one or more of the heat-generating electric components of the rotor PTC 330. In accord with the illustrated example, the rotor shaft 306 is an elongated, right circular cylinder that is fabricated from a rigid metallic or polymeric material as a single-piece structure. A single heat pipe 340 or a set of heat pipes 340 may be mounted onto an outer surface of the rotor shaft, projecting axially between the rotor PTC 330 and the rotor core 322. For high-speed, high-torque applications, multiple heat pipes 340 (e.g., four in the drawings) may be rigidly mounted onto the shaft's OD surface and spaced circumferentially around the rotor shaft 306. These heat pipes 340 may be substantially mutually parallel to one another and to the rotor shaft 306. As best seen in the inset view on the upper lefthand side of FIG. 3, the heat pipes 340 may be spaced substantially equidistant from each other around the rotor shaft 306 (e.g., approximately 90 degrees between neighboring heat pipes). When packaged in this manner, the heat pipes 340 orbit in unison around a rotational shaft axis $A_{R1}$ during rotation of the rotor shaft 306.

The OD surface of the rotor shaft 306 may be covered, in whole or in part, with a polymeric surface coating 358 to help prevent an inadvertent short circuit between the positive and negative slip rings 334A, 334B during electrification of the rotor assembly 318 via the rotor PTC 330. For simplicity of design and manufacture, this rotor shaft surface coating 358 may be formed as a single-piece, unitary structure from an electrically insulating thermoplastic polymer (e.g., injection molded liquid crystal polymer (LCP) resin). In this instance, each heat pipe 340 is at least partially embedded within the polymeric surface coating 358 such that, for example, only a predefined contact area of a radially outermost surface of the heat pipe 340 is exposed through the coating 358. When packaged in this manner, a radially innermost surface of each individual heat pipe 340 may sit flush against the OD surface of the rotor shaft 306. Alternatively, a coating-embedded heat pipe 340 may be radially spaced from the rotor shaft 306 or, alternatively, the proximal (left) axial end of the heat pipe 340 may be radially spaced from the rotor shaft 306 and the opposite distal (right) axial end of the pipe 340 may abut the shaft 306. To electrically insulate the rotor PTC 330 from the heat pipes 340, an optional thermal interface material (TIM), such as acrylic polymer tape strips 364, may be interposed between each heat pipe 340 and the annular slip rings 334A, 334B. It is envisioned that the TIM tape strips 364 may be omitted from the SEM 310, for example, if the heat pipes are fabricated with or coated in an electrically non-conductive material. Moreover, the heat pipes 340 may also help to cool the polymeric surface coating 358 of the rotor shaft 306.

The rotor PTC 330 contains multiple electric components, such as the rotating electromechanical slip rings 334A, 334B of FIG. 3, that circumscribe the rotor shaft 306 and thermally couple to the heat pipes 340. These slip rings 334A, 334B electrically connect the metal/graphite brushes 332A, 332B to the rotor winding 328, e.g., via through-bore conduits or surface-etched leads (not shown). Each heat pipe 340 extends through the central cavities of and thermally couple—directly or indirectly—to the PTC slip rings 334A, 334B. With this arrangement, the heat pipes 340 are substantially orthogonal to and extend axially from the slip rings 334A, 334B, projecting out from the PTC compartment 312 and terminating proximal to (without touching) an axial end of the rotor core 322.

While depicted and described herein as using shaft-mounted heat pipes, the electric machine 310 of FIG. 3 may replace any or all of the heat pipes 340 with thermal-energy dissipating vapor chambers. For instance, a narrow-width, planar vapor chamber may replace each of the heat pipes 340; alternatively, an enlarged-width, curved vapor chamber may replace multiple heat pipes 340. As a further option, herein described shaft mounted heat pipes/vapor chambers may be surface mounted devices (as shown), surface recessed devices (seated within respective channels recessed into the shaft's OD surface), or may be subsurface devices (located within internal rotor shaft slots). It is also envisioned that the SEM 310 assembly may comprise greater or fewer heat pipes 340, which may take on alternative shapes, sizes, and packaging locations from the illustrated configurations.

Each heat pipe 340 projects axially from a terminal end of the rotor shaft 306 to an axial end of the rotor core 322 and concomitantly extracts thermal energy produced by mating PTC components to transfer the extracted thermal energy out from the PTC compartment 312. The heat pipes 340, in effect, act as thermodynamic conduits that interface the heat-generating components of the rotor PTC 330 with a convective-cooling rotor endcap 350 and conductive-cooling dielectric fluid 352 circulating through an internal coolant ("wet area") chamber of the housing 302. As best seen in the inset view on the lower lefthand side of FIG. 3, each heat pipe 340 may be constructed with a hermetically sealed and thermally conductive canister 342, which may be fabricated as a rigid, hollow tube that is formed from copper or aluminum. The heat pipe canister 342 contains a working fluid (represented in FIG. 3 by arrows 344), such as water, acetone, methanol, ammonia, or a mixture of water and refrigerant, that converts thermal energy (heat) into mechanical energy (and vice versa) by changing phases between liquid 344' and gas 344".

Working fluid 344 is free to flow through three adjoining sections of the canister 342: a heat-absorbing "evaporation" section $S_{1E}$ at a proximal end of the canister 342; an intermediate "adiabatic" section $S_{2A}$ at a center of the canister 342 and flanking a terminal end of the evaporation section $S_{1E}$; and a heat-expelling "condensation" section $S_{3C}$ at a distal end of the canister 342 and flanking a terminal end of the adiabatic" section $S_{2A}$. Packaged inside the canister 342 is a fluid-wicking (wick) structure 346 that carries the liquid-phase working fluid 344', e.g., via capillary action, from the condensation section $S_{3C}$ at the distal axial end of the canister 342 to the evaporation section $S_{1E}$ at the proximal axial end of the canister 342. The wick structure 346 may take on innumerable form factors, including a fine-fiber roving wick, a wrapped-textile wick, an intertwined-metal wire wick, a mesh screen wick, a sintered powder wick, etc. As shown, the wick structure 346 presses against and substantially covers an interior surface of the canister 342.

Extending through the center of the heat pipe canister 342 and wick structure 346 is an elongated vapor channel 347 that passes gas-phase working fluid 344" from the evaporation section $S_{1E}$ within the PTC compartment 312, through the adiabatic section $S_{2A}$ extending along the rotor shaft 206, and into the condensation section $S_{3C}$ adjacent the rotor core 322. When the working fluid 344 cools and condenses to a liquid, the vapor channel 347 passes the working fluid 344' into the wick structure 346. For ease of manufacture and simplicity of design, it may be desirable that all of the shaft-mounted heat pipes 340 be substantially structurally identical with one another. Moreover, each heat pipe 340 may be a fluidly sealed, discrete unit that lacks fluid porting, e.g., for exchanging fluid with the internal coolant chamber 303 of the housing 302.

During operation of the electric machine 310, the electric components of the rotor PTC 330 will generate friction-borne and resistance-borne heat, especially during high-speed operations (e.g., 10,000+ RPM). A portion of this PTC-generated heat will be transferred through the sealed canisters 342 and into the wick structures 346 of the heat pipes 340. In particular, thermal energy conducts through a proximal end of the heat pipe canister 342—evaporation section $S_{1E}$—causing a portion of the working fluid 344 sealed within the canister 342 to evaporate. When the working fluid 344 is vaporized from absorbing PTC-generated heat, the wick structure 346 functions to pass the gas-phase fluid 344" into the vapor channel 347. The gas-phase working fluid 344" migrates axially, e.g., to the right in FIG. 3, through the vapor channel 347 and condenses at the distal end of the heat pipe canister 342 into the condensation section $S_{3C}$. When condensed, the wick structure 346 functions to draw the fluid 344 out of the vapor channel 347. The liquid-phase fluid 344' is pulled axially, e.g., to the left under the force of capillary action, through the wick structure 346 to the evaporation section $S_{1E}$ to start the cycle anew.

To help dissipate thermal energy expelled from the PTC 330 via the heat pipes 340, a thermally conductive rotor endcap 350 may be securely mounted onto the PTC-facing axial end of the rotor core 322 in abutting relation to the heat-expelling longitudinal ends of the heat pipes 340. It may be desirable that this rotor endcap 350 be fabricated with a circumferentially spaced set of heat pipe cavities 351 (e.g., one cavity per heat pipe) that thermally interfaces with the SEM heat pipes 340. Each heat pipe cavity 351 may be recessed into a radially-inward facing surface of the rotor endcap 350 and nests therein a longitudinal tip of a respective heat pipe 340. These cavities 351 help to increase the contact surface area between the endcap 350 and the heat pipes 340 and thereby increase the rate of conductive heat transfer between the interfacing structures. In addition to helping reduce windage losses and ensure the rotor windings 328 are supported for high-speed machine operation, the rotor endcap 350 acts as a thermal-body heat sink for absorbing and dissipating heat received from the heat pipes 340.

With continuing reference to FIG. 3, the rotor endcap 350 may be fabricated with a set of endcap fins 354 that is designed to dissipate heat accumulated by the endcap 350 from the rotor assembly 318 and PTC 330 into the internal coolant chamber 303 of the housing 302. Located on an outboard-facing axial surface of the rotor endcap 350, these heat-transferring endcap fins 354 may be pin-type, plane-type, or wave-type fins that project axially away from the rotor core 322 and into the housing's internal coolant chamber 303. The endcap fins 354 increase the total surface area of the rotor endcap 350 that is exposed within the housing 302 to increase the dissipation of extracted thermal energy received by the rotor endcaps 350, e.g., via convective and, if desired, conductive heat transfer.

To help evacuate thermal energy from the machine housing 302, an optional active thermal management (ATM) system (represented in FIG. 3 via oil pump 362) may circulate dielectric coolant fluid 352 into and out of the housing 302 to splash-cool or spray-cool the rotor endcaps 350 and endcap fins 354. The coolant fluid 352 may be an electrically non-conductive, magnetically null oil that is sprayed onto the stator windings 326 and rotor endcaps 350, e.g., via spray nozzles in a stator endcap 360, to accelerate the heat-dissipating effects of the heat pipes 340 and endcap 350. In addition to the increased convective cooling offered by the rotor endcaps 350 and endcap fins 354, the spray/splash of coolant fluid 352 offers immersion-type conductive heat transfer. The spray/splash cooling for the rotor assembly 318 can also be directed to the stator assembly 316 to further improve the peak performance of the electric machine 310. For splash-cooling implementations, it may be desirable that a set of rotor pin fins be arranged in a helical turbine-like pattern to excite the coolant fluid 352 and thereby generate a desired splash effect during excitation of the rotor assembly 318.

During operation of an SEM-type electric machine 310 with a contact-based (brushed) rotor PTC 330, the interfaces at which the brushes 332A, 332B meet their respective slip rings 334A, 334B generate heat due to bristle-on-surface sliding friction and electric resistance to large current magnitudes. The heat pipes 340 may function, at least in part, to extract the heat produced at the slip ring and brush interface and transfer the extracted heat to a larger thermal mass, such as the rotor endcap 350. Cooling the rotor PTC 330 in this manner may help to reduce the total number/size of the brushes with a concomitant increase in current density per brush while minimizing wear and drag on the brushed PTC system. Furthermore, the brush carrier assemblies 314 may be fabricated as molded plastic components that are susceptible to high temperatures; effectively extracting heat from the PTC region may help to prolong the operational life expectancy of the brush carrier assemblies 314 while increasing peak current magnitudes through the PTC 330.

The passive and active thermal management features described above with respect to the contact-type rotor PTC configuration of FIG. 3 may likewise be applied to remove heat from non-contact type rotor PTCs. By way of non-limiting example, an electric machine 410 with an inductive non-contact type rotor PTC 430 is presented in FIG. 4 whereas an electric machine 410 with a capacitive non-contact type rotor PTC 530 is presented in FIG. 5. Unless explicitly stated otherwise, the features and options described above with reference to FIG. 3 may carry over to the SEM architectures of FIGS. 4 and 5, wherein like reference numbers are used to designate like parts from FIG. 3. In FIG. 4, for example, the brushes 332A, 332B, slip rings 334A, 334B, and attendant hardware of FIG. 3 are replaced by an electromagnetic induction coupling (rotating transformer) composed of an annular outer "stationary" core 432 that is concentric with an annular inner "rotating" core 434 and the rotor shaft 306. The outer core 432 is rigidly secured inside the PTC compartment 312 and carries an outer induction coil 436 exposed through a radially inner face of the core 432. The stationary core 432 circumscribes the inner core 434, which securely mounts onto the rotor shaft 306 to rotate in unison therewith and carries an inner induction coil 438. that electromagnetically mates with the outer induction coil 436. Operatively connected to the inner core 434 is a rectifier PCB 470 and a complementary rectifier heat sink 472 that are also mounted onto the rotor shaft 306 to rotate in unison therewith. The heat pipes 340 thermally couple with the inner core 434 and rectifier PCB 470 to extract and dissipate their heat. The rectification PCB 470 contains power electronic components, such as rectification diodes, that may generate a significant amount of heat. Passively cooling these components using the heat pipes 340 (or vapor chambers) extends their operation life expectancies, enables peak power, and helps to reduce component size.

In FIG. 5, the brushes 332A, 332B, slip rings 334A, 334B, and attendant hardware of FIG. 3 are replaced by a rotating capacitive coupling composed of an outer "stationary" capacitive plate 532 that is axially spaced from and facing an inner "rotating" capacitive plate 534. The outer capacitive plate 532 is rigidly secured inside the PTC compartment 312 and concentric with the rotor shaft 306. The inner capacitive plate 534 is coaxial with the outer capacitive plate 532 and securely mounted onto the rotor shaft 306 to rotate in unison therewith. Operatively connected to the inner capacitive plate 534 is a rectifier PCB 570 and a complementary rectifier heat sink 572 that are also mounted onto the rotor shaft 306 to rotate in unison therewith. The heat pipes 340 thermally couple with the capacitive plate 534 and rectifier PCB 570 to extract and dissipate their heat. Passively cooling these components using the heat pipes 340 (or vapor chambers) may help to prolong their operational life, enable higher power, and reduce component size.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electric machine, comprising:
   a housing;
   a stator assembly including a stator core attached to the housing and an electromagnetic stator winding mounted to the stator core;
   a rotor assembly including a rotor core rotatably attached to the housing adjacent the stator assembly and an electromagnetic rotor winding mounted to the rotor core;
   a rotor power transfer circuit (PTC) attached to the housing, spaced axially from the rotor core, and electrically connected to the rotor assembly to electrify the rotor winding;
   a rotor shaft attached to the rotor core to rotate in unison therewith; and
   a heat pipe mounted on an outer surface of the rotor shaft and projecting axially between the rotor PTC and the rotor core, the heat pipe being configured to passively extract thermal energy from the rotor PTC and transfer the thermal energy out of the rotor PTC.

2. The electric machine of claim 1, wherein the heat pipe includes a plurality of heat pipes mounted on the outer surface and spaced circumferentially around the rotor shaft.

3. The electric machine of claim 2, wherein the heat pipes abut the outer surface and are parallel with the rotor shaft.

4. The electric machine of claim 2, wherein the heat pipes are mutually parallel and spaced equidistant from each other.

5. The electric machine of claim 2, wherein the outer surface of the rotor shaft includes a polymeric surface coating, and wherein the heat pipes are at least partially embedded within the polymeric surface coating.

6. The electric machine of claim 2, further comprising a thermal interface material (TIM) interposed between and electrically insulating the heat pipes and the rotor PTC.

7. The electric machine of claim 2, wherein the rotor PTC includes a plurality of electric PTC components circumscribing the rotor shaft, and wherein the heat pipes extend through central cavities of and thermally couple to the electric PTC components.

8. The electric machine of claim 7, wherein the electric PTC components include first and second electric brushes coupled with first and second slip rings, and wherein the heat pipes contact the first and second slip rings.

9. The electric machine of claim 1, wherein the heat pipe includes a sealed canister containing a working fluid configured to change phases between a liquid phase and a gas phase to thereby extract the thermal energy from the rotor PTC and transfer the thermal energy out through an axial end of the rotor PTC.

10. The electric machine of claim 9, wherein the heat pipe further includes a wick structure located inside the sealed canister and configured to transfer the working fluid, when in the liquid phase, from a first axial end to a second axial end of the sealed canister.

11. The electric machine of claim 1, further comprising a rotor endcap attached to an axial end of the rotor core and abutting a longitudinal end of the heat pipe to receive therefrom the extracted thermal energy transferred out of the rotor PTC.

12. The electric machine of claim 11, wherein the longitudinal end of the heat pipe is radially interposed between the rotor endcap and the rotor shaft.

13. The electric machine of claim 11, wherein the rotor endcap includes a plurality of endcap fins protecting away from the rotor core and configured to dissipate the extracted thermal energy transferred out of the rotor PTC and received by the rotor endcap.

14. A motor vehicle comprising:

a vehicle body;

a plurality of road wheels attached to the vehicle body;

a rechargeable energy storage system (RESS) attached to the vehicle body; and a traction motor attached to the vehicle body, electrically connected to the RESS, and configured to drive one or more of the road wheels to thereby propel the motor vehicle, the traction motor including:

a motor housing;

a stator assembly rigidly mounted inside the motor housing, the stator assembly including an annular stator core and a plurality of electromagnetic stator windings mounted in circumferentially spaced stator slots of the stator core;

a rotor assembly rotatably mounted inside the motor housing adjacent the stator assembly, the rotor assembly including a cylindrical rotor core nested inside the annular stator core and a plurality of electromagnetic rotor windings mounted in circumferentially spaced rotor slots of the rotor core;

a rotor power transfer circuit (PTC) mounted inside the motor housing, spaced axially from the rotor core, and electrically connected to the rotor assembly to selectively electrify the rotor windings;

a rotor shaft circumscribed by and attached to the rotor core to rotate in unison therewith; and a plurality of heat pipes mounted on an outer-diameter (OD) surface of and spaced circumferentially around the rotor shaft, each of the heat pipes being configured to passively extract thermal energy from the rotor PTC and transfer the thermal energy out of the rotor PTC.

15. A method of assembling an electric machine, the method comprising:

receiving a housing of the electric machine;

attaching a stator assembly to the housing, the stator assembly including a stator core and an electromagnetic stator winding mounted to the stator core;

attaching a rotor assembly to the housing such that the rotor assembly is adjacent and rotatable with respect to the stator assembly, the rotor assembly including a rotor core and an electromagnetic rotor winding mounted to the rotor core;

attaching a rotor power transfer circuit (PTC) to the housing such that the rotor PTC is spaced axially from the rotor core and electrically connected to the rotor assembly to electrify the rotor winding;

attaching a rotor shaft to the rotor core to rotate in unison therewith; and mounting a heat pipe on an outer surface of the rotor shaft such that the heat pipe projects axially between the rotor PTC and the rotor core, the heat pipe being configured to passively extract thermal energy from the rotor PTC and transfer the thermal energy out of the rotor PTC.

16. The method of claim 15, wherein the heat pipe includes a plurality of heat pipes mounted on the outer surface and spaced circumferentially around the rotor shaft.

17. The method of claim 16, wherein the heat pipes abut the outer surface and are parallel with the rotor shaft.

18. The method of claim 16, wherein the heat pipes are mutually parallel and spaced equidistant from each other.

19. The method of claim 16, wherein the outer surface of the rotor shaft includes a polymeric surface coating, and wherein the heat pipes are at least partially embedded within the polymeric surface coating.

20. The method of claim 16, wherein the rotor PTC includes a plurality of electric PTC components circumscribing the rotor shaft, and wherein the heat pipes extend through central cavities of and thermally couple to the electric PTC components.

\* \* \* \* \*